United States Patent
Tavares (10) Patent No.: US 9,972,027 B1
(45) Date of Patent: May 15, 2018

(54) SYSTEM AND METHOD OF TRACKING THE EFFECTIVENESS OF VIEWING RESOURCES ON ELECTRONIC DEVICES IN CAUSING TRANSACTION ACTIVITY TO SUBSEQUENTLY OCCUR AT A PHYSICAL LOCATION ASSOCIATED WITH THE RESOURCES

(71) Applicant: VSK Ventures, LLC, San Mateo, CA (US)

(72) Inventor: Silvio Tavares, San Mateo, CA (US)

(73) Assignee: VSK Ventures, LLC, Burlingame, CA (US)

( * ) Notice: Subject to any disclaimer, the term of this patent is extended or adjusted under 35 U.S.C. 154(b) by 592 days.

(21) Appl. No.: 14/525,945

(22) Filed: Oct. 28, 2014

Related U.S. Application Data (63) Continuation of application No. 14/165,898, filed on Jan. 28, 2014.

(51) Int. Cl.
  *G06Q 30/00* (2012.01)
  *G06Q 30/02* (2012.01)

(52) U.S. Cl.
  CPC ..... *G06Q 30/0246* (2013.01); *G06Q 30/0201* (2013.01); *G06Q 30/0242* (2013.01); *G06Q 30/0267* (2013.01)

(58) Field of Classification Search
  None
  See application file for complete search history.

(56) References Cited

U.S. PATENT DOCUMENTS

| | | |
|---|---|---|
| 2008/0215290 A1 | 9/2008 | Zweben et al. |
| 2009/0216579 A1* | 8/2009 | Zen .................. G06Q 20/12 705/14.1 |

(Continued)

OTHER PUBLICATIONS

"Uniform Resource Identifier" definition in Microsoft Press Computer Dictionary, Third Edition, Copyright © 1997 by Microsoft Corporation, p. 484, 3 pages.

(Continued)

*Primary Examiner* — Matthew T Sittner
*Assistant Examiner* — Richard G Reinhardt
(74) *Attorney, Agent, or Firm* — Panitch Schwarze Belisario & Nadel LLP (57) ABSTRACT

Systems and methods are provided to measure the effectiveness of viewing resources, such as web-based advertisements or web pages, on electronic devices in causing transaction activity to subsequently occur at a physical location associated with the resources. A first set of data records is provided that includes a uniform resource identifier (URI) of a resource that was viewed by an electronic device, one or more physical locations, each physical location representing a physical location of the merchant associated with the URI, a date/time that the resource was viewed by the electronic device, and payment instrument indicia regarding a payment instrument which has been used for completion of a previous web-based transaction by an electronic device having the same UDID that viewed the URI of the resource. A second set of data records is provided that includes payment instrument indicia regarding a payment instrument which has been used for completion of a previous transaction at a physical location of a merchant, a physical location of the merchant, and a date/time that the previous transaction at the physical location of the merchant occurred. Data records in the two sets are compared to identify data records that have matching payment instrument indicia, matching physical locations (Continued)

and a date/time in the data record of the first set which is a predetermined amount of time prior to the date/time in the data record of the second set.

16 Claims, 3 Drawing Sheets

(56) References Cited

U.S. PATENT DOCUMENTS

| | | | |
|---|---|---|---|
| 2009/0313109 A1* | 12/2009 | Bous | G06O 30/02 705/14.31 |
| 2012/0209630 A1* | 8/2012 | Ihm | G06Q 20/02 705/4 |

OTHER PUBLICATIONS

"Payment gateway" entry in Wikipedia, printout from webpage: http://en.wikipedia.org/w/index.php?title=Payment_gateway& printable=yes, Page last modified Dec. 14, 2013, printout date: Jan. 9, 2014, 3 pages.

\* cited by examiner

SYSTEM AND METHOD OF TRACKING THE EFFECTIVENESS OF VIEWING RESOURCES ON ELECTRONIC DEVICES IN CAUSING TRANSACTION ACTIVITY TO SUBSEQUENTLY OCCUR AT A PHYSICAL LOCATION ASSOCIATED WITH THE RESOURCES

CROSS REFERENCE TO RELATED APPLICATION

This application is a continuation of copending U.S. patent application Ser. No. 14/165,898 filed Jan. 28, 2014, the entire disclosure of which is incorporated by reference herein.

BACKGROUND OF THE INVENTION

Merchants who conduct some or all of their business from physical locations have many options for a marketing/ad budget, including purchasing conventional media advertisements (e.g., print, TV, radio). Some of these conventional media outlets have proven methods for tracking the effectiveness of the ad campaigns. Furthermore, these media outlets are so well-established that merchants have a comfort level using them, even if they cannot directly measure their effectiveness. Tracking the effectiveness of web-based ad campaigns is a notoriously difficult task in the industry. Accordingly, merchants have little solid evidence to determine whether to even conduct such ad campaigns, or whether money spent on a campaign had a sufficiently positive return on investment to justify continued spending on the existing campaign or on a new campaign. Merchants who conduct some or all of their business from physical locations may be reluctant to conduct web-based ad campaigns due to the inability to gauge their effectiveness.

Accordingly, there is an unmet need to provide systems and methods for tracking the effectiveness of such web-based ad campaigns, particularly with respect to merchants who conduct some or all of their business from physical locations. The present invention fulfills such a need by providing systems and methods for attributing digital ads and the like to physical purchases.

BRIEF SUMMARY OF THE INVENTION

Preferred embodiments of the present invention provide systems and methods to measure the effectiveness of viewing resources, such as web-based advertisements or web pages, on electronic devices in causing transaction activity to subsequently occur at a physical location associated with the resources. A first set of data records is provided that includes a uniform resource identifier (URI) of a resource that was viewed by an electronic device, one or more physical locations, each physical location representing a physical location of the merchant associated with the URI, a date/time that the resource was viewed by the electronic device, and payment instrument indicia regarding a payment instrument which has been used for completion of a previous web-based transaction by an electronic device having the same UDID that viewed the URI of the resource. A second set of data records is provided that includes payment instrument indicia regarding a payment instrument which has been used for completion of a previous transaction at a physical location of a merchant, a physical location of the merchant, and a date/time that the previous transaction at the physical location of the merchant occurred. Data records in the two sets are compared to identify data records that have matching payment instrument indicia, matching physical locations and a date/time in the data record of the first set which is a predetermined amount of time prior to the date/time in the data record of the second set.

BRIEF DESCRIPTION OF THE DRAWINGS

Preferred embodiments of the present invention will now be described by way of example with reference to the accompanying drawings.

DETAILED DESCRIPTION OF THE INVENTION

Certain terminology is used herein for convenience only and is not to be taken as a limitation on the present invention.

I. Overview of Preferred Embodiments

Electronic devices such as personal computers and mobile devices (e.g., smartphones, tablets) are typically assigned a unique device identifier, often referred to as a "device ID" or a "UDID." When a web-based transaction is made using an electronic device, and payment is made for the transaction with a payment instrument such as a credit card, the UDID and the primary account number (PAN) or a token thereof (referred to collectively as the "PAN data") of the payment instrument is transmitted over a network to authorize and complete the transaction. There are many steps in the transaction process, and many different entities that are involved, including a merchant computer, a payment gateway, a payment processor, and a financial institution that issued the payment instrument (e.g., a card issuer, which is often a bank). One of the functions of the payment gateway and/or payment processor is to detect fraud. To assist in that goal, one or both of these entities build and maintain a database of UDID and PAN data, and more specifically, the UDID and corresponding PAN data associated with previous transactions (i.e., UDID/PAN data pair combinations). When a new web-based transaction is requested, the database is consulted for potential fraud detection. There are many potential indicators of fraud, and the UDID/PAN database is just one of many indicators that are used to make a final determination of whether to authorize the web-based transaction. One preferred embodiment of the present invention captures UDID/PAN combinations from these conventional transaction processing entities and stores them in a remote database for subsequent use in the same manner as the prior art, but for a different purpose, as described below.

Figure 1:
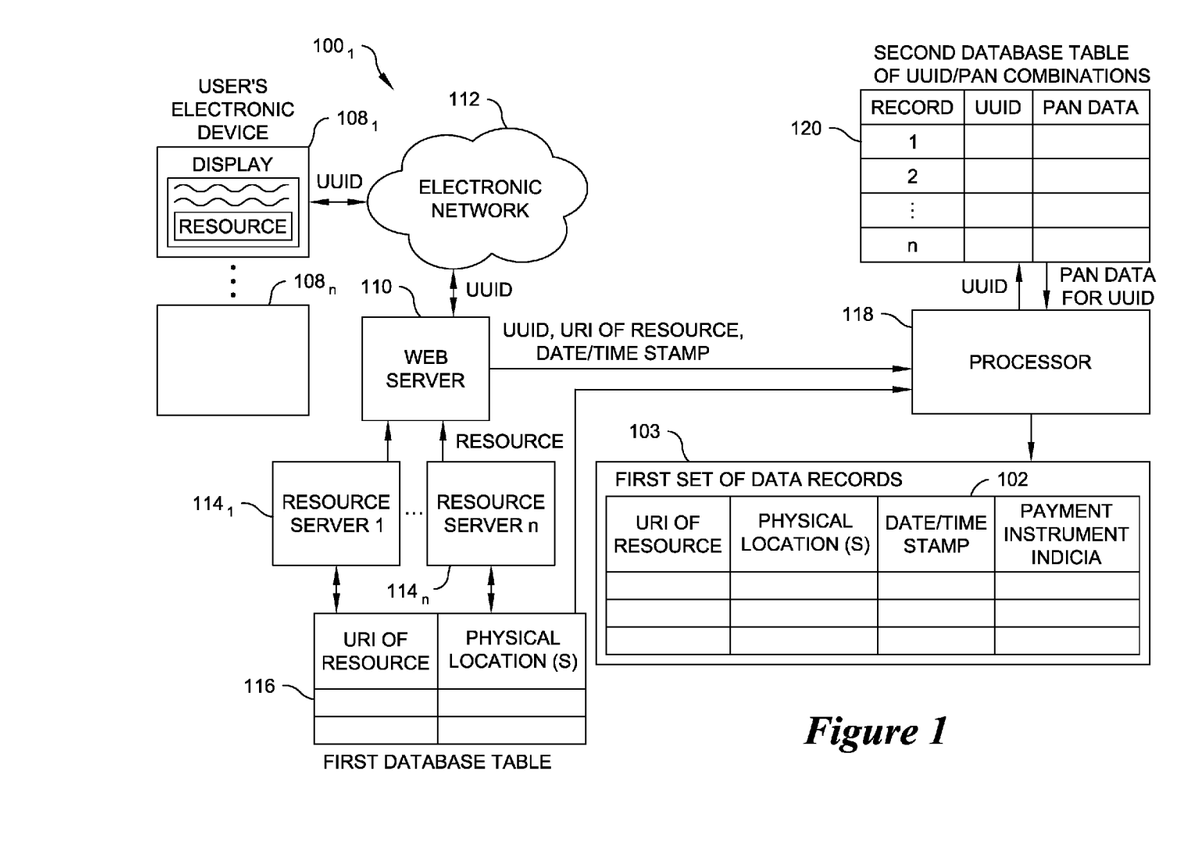
FIGS. 1-3, taken together, show schematic diagrams of system components in accordance with preferred embodiments of the present invention.
Figure 2:
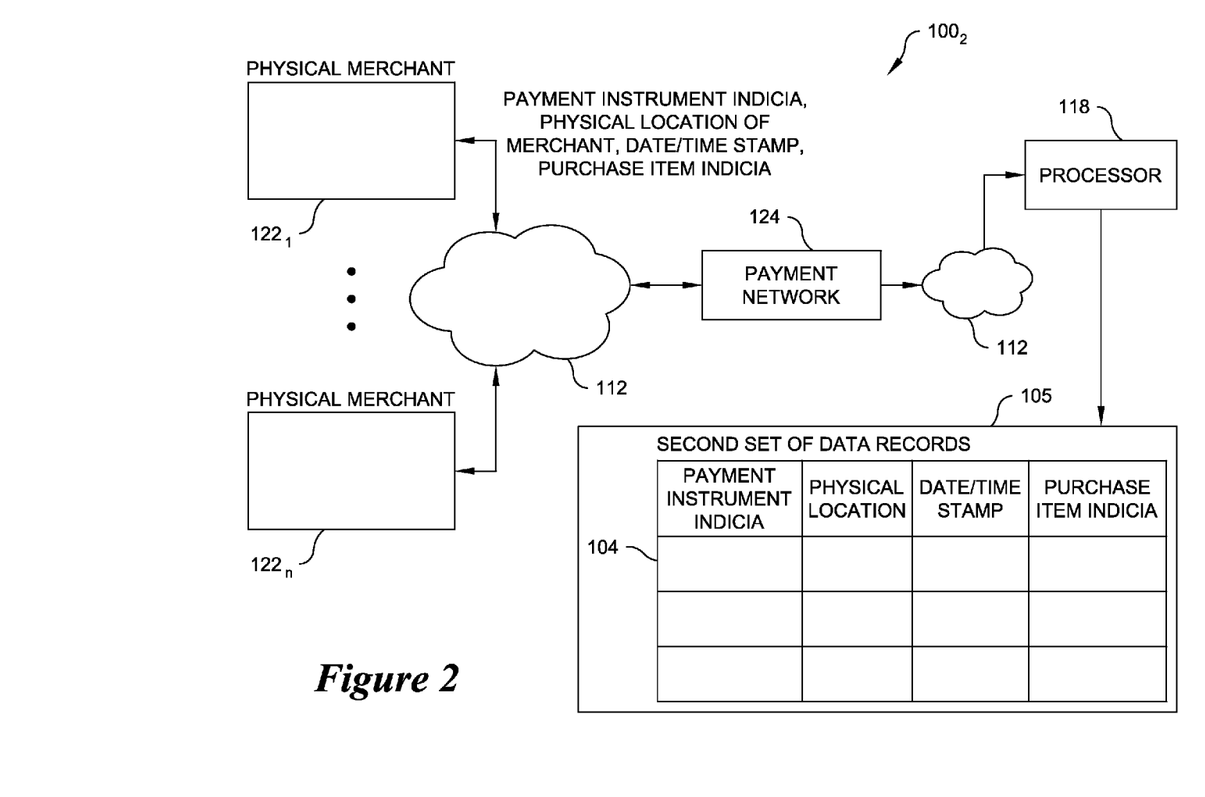
Figure 3:
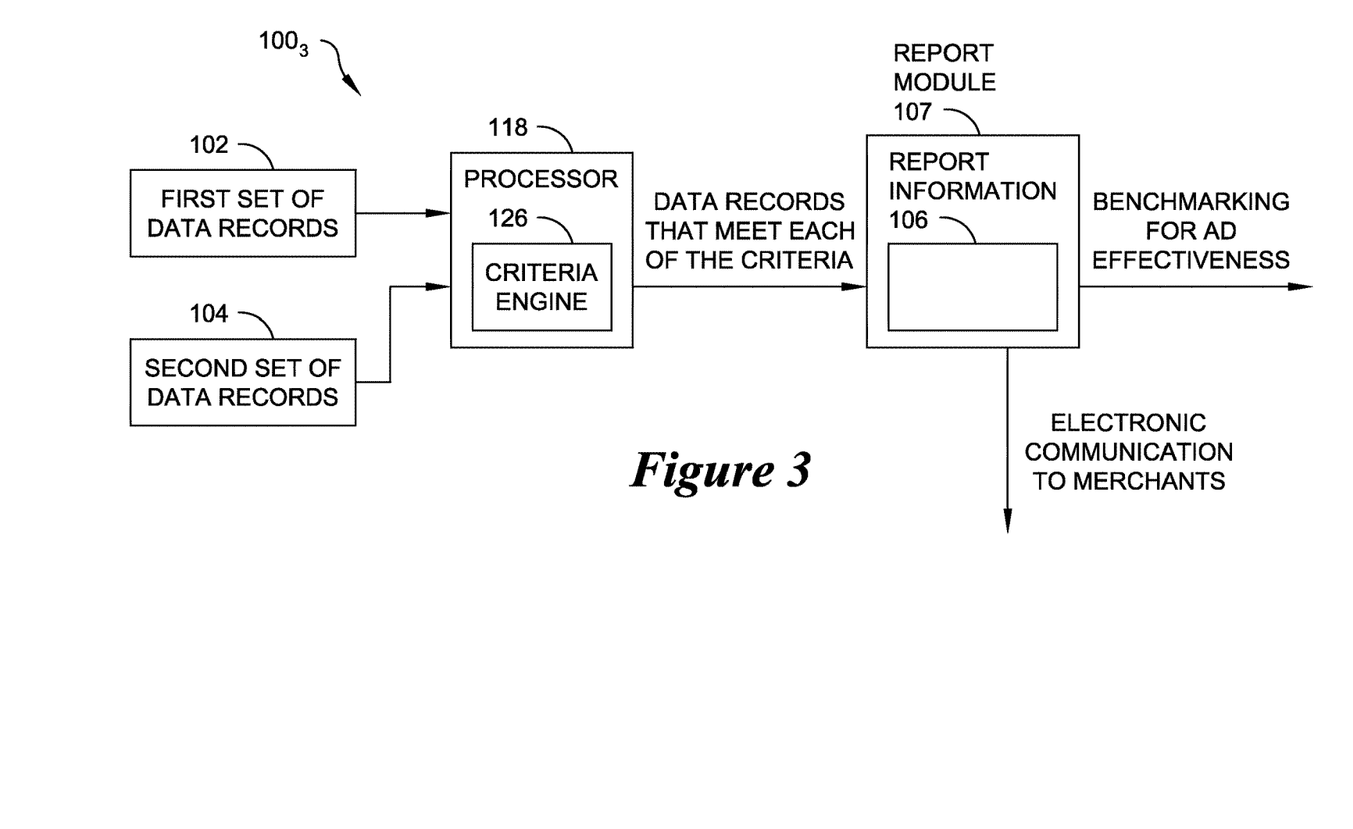

FIGS. 1-3, taken together, show system components for tracking the effectiveness of viewing resources on electronic devices in causing transaction activity to subsequently occur at a physical location associated with the resources. In the preferred embodiment, it is presumed that each electronic device has a unique device identifier (UDID). There are three different sets of system components that work together to perform this function. FIG. 1 shows a system $100_1$ that builds a first set of data records 102 in a first memory 103, the contents of which are described in detail below. FIG. 2 shows a system $100_2$ that builds a second set of data records 104 in a second memory 105, the contents of which are also described in detail below. FIG. 3 shows a system $100_3$ that compares the first set of data records 102 and the second set of data records 104 to create report information 106 which can be used for tracking the effectiveness of viewing resources on electronic devices in causing transaction activity to subsequently occur at a physical location associated with the resources, and for other purposes. (In the DETAILED DISCLOSURE, the first set of data records 102 is referred to as a "digital cookie" and the second set of data records 104 is referred to as a "physical spendmap.")

Referring to FIG. 1, a plurality of different user electronic devices 108 communicate with a plurality of different web servers 110 (only one web server 110 is shown in FIG. 1) via one or more electronic networks 112 (e.g., the Internet, mobile communication network) during web browsing sessions, as is well-known in the art. During web browsing, resources may be electronically delivered from resource servers 114 via web servers 110 to the displays of respective electronic devices 108. Examples of resources include the following:

1. a web-based advertisement, a web-based offer, a mobile offer or a mobile advertisement from a specific entity which is inserted into a web page, and which is displayed as part of the web page display for at least some part of a web viewing session.

2. a web page associated with a specific entity which is displayed as the entire web page display for at least some part of a web viewing session.

Ad servers are one well-known type of device that perform the functions of the resource servers 114. As is also well-known in the art, each resource has a designated a uniform resource identifier (URI), such as a uniform resource locator (URL).

To implement preferred embodiments of the present invention, a first database table 116 is maintained that includes one or more physical locations for each URI of a resource that is delivered by the resource servers 114. For example, if the URI is a web-based advertisement or web page for a merchant that has only one physical location, the physical location in the first database table 116 is the merchant's physical location. If the URI is a web-based advertisement or web page for a merchant that has a plurality of physical locations, the physical locations in the first database table 116 are the merchant's plurality of physical location.

To further implement preferred embodiments of the present invention, a processor 118 receives various information from the web servers 110 and the first database table 116, including at least the following information regarding each resource that was viewed by the respective electronic devices 108:

1. UUID of the electronic device 108

2. URI of the resource and the respective physical location(s)

3. date/time stamp (data/time that the resource was viewed by the electronic device 108)

The system 100$_1$ further includes a second database table 120 of UUI/PAN data combinations 120. As discussed above, it is known in the art to maintain databases of this type of information for fraud detection purposes. To implement preferred embodiments of the present invention, the second database table 120 is used by the processor 118 to retrieve PAN data for each UUID that the processor 118 receives from the web servers 110. In this manner, the processor 118 can associate each viewed resource with PAN data of the person who likely viewed the resource. The processor 118 uses the information that it received to electronically create a first set of data records 102. Each data record in the first set of data records 102 includes at least the following information:

1. a uniform resource identifier (URI) of a resource that was viewed by an electronic device 108, 2. one or more physical locations, each physical location representing a physical location of a merchant associated with the URI, 3. a date/time that the resource was viewed by the electronic device 108, and 4. payment instrument indicia (e.g., PAN data) regarding a payment instrument which has been used for completion of a previous web-based transaction by an electronic device having the same UDID as the electronic device 108 that viewed the URI of the resource. One example of a web-based transaction is a transaction with an on-line merchant which may or may not have a physical location where items may be purchased.

If there is no UUI/PAN data combination in the second database table 120, then no data record is stored. However, in most instances, a UUI/PAN data combination will exist for a given UUID that is received by the processor 118, as long as the second database table 120 has access to the most updated and complete data records available in the industry. This is because most active electronic devices are regularly used to conduct web-based transactions.

In an alternative embodiment, if a merchant that has a very large number of physical locations (e.g., Sears, Home Depot), the physical locations which are stored in the first set of data records 102 may be limited to those which are within a predefined radius of the estimated location of the electronic device 108, as determined by any of the many conventional means for estimating device location (e.g., ISP data, cellphone tower data).

Referring to FIG. 2, the processor 118 builds a second set of data records 104 by receiving from physical merchants 122 via payment networks 124 (only one payment network 124 is shown in FIG. 2), PAN data of actual transactions that occurred at the merchant's physical location, the merchant's physical location, and a date/time stamp of the transactions. The payment network 124 includes many conventional elements which are not shown in FIG. 2, such as a payment gateway, a payment processor, and a computer associated with the issuer of the payment instrument. Each data record in the second set of data records 104 includes at least the following information:

1. payment instrument indicia (e.g., PAN data) regarding a payment instrument which has been used for completion of a previous transaction at a physical location of a merchant, 2. a physical location of the merchant, and 3. a date/time that the previous transaction at the physical location of the merchant occurred.

This type of information is conventionally available from credit card records and often appears on credit card statements.

Referring to FIG. 3, the processor 118 uses a criteria engine 126 to electronically compare the first set of data records 102 with the second set of data records 104 to identify any data records wherein a data record in the first set of data records 102 and a data record in the second set of data records 104 meet each of the following criterion:

1. The payment instrument indicia in the data record of the first set of data records 102 matches the payment instrument indicia in the data record of the second set of data records 104.

2. One of the physical locations in the data record of the first set of data records 102 matches the physical location in the data record of the second set of data records 104. In determining whether this criterion is met, the physical locations are deemed to match if the locations are within a defined radius of each other, wherein the radius is defined by a set of business rules.

3. The date/time in the data record of the first set of data records 102 is a predetermined amount of time prior to the date/time in the data record of the second set of data records 104. The predetermined amount of time may be as short as a few minutes so as to identify purchase activity resulting from a mobile device receiving an ad impression for a geographically close merchant, such as in response to a location-based ad serving algorithm, or the predetermined amount of time may be one day, one week or one month to capture non-impulse-based purchase activity.

Data records that meet each of the criterion above are outputted to a report module 107 as report information 106 which can be used for tracking the effectiveness of viewing resources on electronic devices in causing transaction activity to subsequently occur at a physical location associated with the resources, and for other purposes.

Each data record in the second set of data records and any corresponding report information preferably also includes purchase item indicia, such as the total purchase amount of the transaction, and/or specific SKU's associated with the transaction. In this manner, the report information is further usable to gauge the value of the transaction activity. For example, an occasional large purchase that can be tied back to a web-based ad campaign may be more cost-effective than more frequent small purchases that can be tied back to a web-based ad campaign.

In one preferred embodiment, merchants automatically receive electronic communications, either in real-time or at periodic intervals, when any data records are identified that meet each of the criterion.

As discussed above, the payment instrument indicia may include a primary account number (PAN) of the payment instrument or a token of a PAN of the payment instrument.

In one preferred embodiment, the physical location of a merchant is represented in the data record by a latitude and longitude.

The effectiveness of web-based advertisements is often measured via click-through rates (percentage of individuals viewing a web page who click on a specific advertisement that appears on the page), and/or conversion rates (percentage of click-throughs that lead to actual sales). In preferred embodiments of the present invention, the effectiveness of web-based advertisements may be gauged based on the number of physical purchasers who can be tied back to a web viewing session by the same person (via the common PAN data) and the value of their physical purchases.

Using the process described above, merchants can now for the first time be able to compare the amount of money that they spend on a web-based ad campaign to the transaction activity that occurs at the physical location of the merchant which is likely attributable to the web-based ad campaign. Merchants can then better gauge whether their advertising budgets are being effectively allocated to web-based and non-web-based avenues.

In one preferred embodiment, the processor 118 in each of the FIGS. 1-3 is the same processor and is controlled by a single service provider which creates and maintains the first and second sets of data records 102 and 104, performs the comparisons therebetween, and provides output reports and metrics to their clients. In alternative embodiments, the processor 118 in each of the FIGS. 1-3 is a plurality of distinct processors which may be distributed among different locations and managed/controlled by different entities who cooperate with each other to create and manage the first and second sets of data records 102 and 104, and generate the report information 106.

II. Detailed Disclosure

The financial transactions of a user are indexed into a serial list that is associated with a unique user ID (unique ID). Each financial transaction record in the list is associated with a specific geo-location where it occurred (e.g., a latitude and longitude, also referred to below as "lat" and "long").

The websites and advertisements that a consumer have viewed through an internet connected device are associated with specific physical locations (e.g., a latitude and longitude) and are compiled in a time sequenced list which are tied to the unique ID. The physical locations associated with websites and ads are advertiser-defined or established by an indexing algorithm using geo-location data from a database.

A database continuously receives the lists for web and financial transactions. An algorithm is used to continuously match the website physical locations and financial transaction physical locations by unique ID. When a location match for a unique ID occurs and it is based on predetermined criteria, the pre-occurring location matched ad or website is credited with the transaction and a message is sent to the advertiser confirming a successful ad impression. The success index of the ad is used to optimize future ad placements.

Step-By-Step Description

1. Geo-SpendMap: SpendMap Sequenced to Time (Time and Lat Long)

A consumers payment transactions are recorded and sequenced according to time and merchant location (lat/long). There is a unique spendmap for each person or individual. The payment transaction record includes at least the following items:
  i. lat/long coordinate
  ii. Date and time stamp
  iii. a spend amount (currency denominated)
  iv. a merchant category (if available)
  v. an indicator of type of goods purchased (if available)
  vi. payment instrument number or token (PAN data)
    a. Multiple Payment Types Standardized to SpendMap Transactions from multiple different payment mechanisms are standardized and sequenced in the same manner. Payment mechanisms include multiple payment card brands, prepaid cards and digital wallet transactions
    b. SpendMap Indexed to an Individual The payment transactions are grouped or indexed to an individual person.
  i. User Defined: by the person/individual associating multiple payment card numbers or payment instruments to a single person; or
  ii. Third Party (e.g., credit bureau): based on household information available from a third party database; or
  iii. By Coincident Mobile GPS: by matching particular card transactions transmitted in real time by the merchant's point of sale with a coincident known geospatial indicator system such as mobile phone, vehicle positioning system or tracking device that is transmitting the same geospatial coordinate (lat/long). When a particular mobile phone identifier is persistently present (same lat long) and when a particular card is transacting at a matching merchant POS GPS coordinate, then the mobile phone and payment card and individual are matched and become linked.

2. Digital Cookie Linked to SpendMap

A matrix of an individual's consumer's website and mobile web visits are catalogued by web address/url and time stamp. There is one digital sequence per user. The digital cookie record includes at least the following items:
 i. URL (web address)
 ii. Date and time stamp (begin and end)
 iii. Device ID
 iv. List of Geospatial coordinates The Device ID is associated with the unique payment instrument number or token of the user based on previous web or mobile transactions where that payment instrument number or token were present at the same time as the Device ID.

Each digital website address is indexed to a list of geospatial coordinates. Multiple lat/long geospatial coordinates can be indexed to a single website address. This index of lat/long is created by the website or URL owner or by a third party data system.

3. Match Algorithm

The time stamp and geospatial coordinates (lat/long) of the spendmap for an individual are continuously compared to the time stamp and geo-sequence of the digital cookie for that same individual.

For a given individual when there are matches between a lat long pair contained in the Spendmap with the digital cookie AND when the match occurs and the time stamps of the digital cookie occurs during a fixed time window (fixed by a logic rule) before the spendmap LAT/LONG, THEN a positive match is made between the digital website and the purchase.

Sample Applications (Utility)
 i. Determining sales return on investment metric for a particular web site or digital property.
 ii. Calculating location propensity/likelihood of a given individual to spend at a particular merchant or merchant type based on their current location and historical purchases at that location.

Illustrative Example

Step A: User Web Site Flow—Digital Cookie
1. A user makes an online (web-based) transaction with a credit card number ("PAN").
2. The user credit card number ("PAN") is associated with the device ID ("DEV ID"). The DEV ID is sourced from and is unique to the computer or mobile device that is used. A unique user ID ("UU ID") is generated which is uniquely associated with the PAN and DEV ID. Depending on whether there is a purchase transaction or simply a visit by the UU ID, a transaction code is recorded ("TCODE").
3. Whenever the DEV ID appears at a website in the future, a DIGITAL COOKIE record is created which also includes the geo-location (lat, long) ("GEO ID') of the website visited or ad viewed.

In one preferred embodiment, the DIGITAL COOKIE records are represented as follows (two sample records are shown):
Record 1: UU ID=123456, PAN=66234, DEV ID=3435678, TIME=13:62, Dec 12 2012, GEO ID=a) 13 deg×15 deg b) 14 deg×23 deg, URL=www.vsk.com TCODE=BUY
Record 2: UU ID=123456, PAN=66234, DEV ID=3435678, TIME=15:34, Dec 13 2012, GEO ID=a) 14 deg×18 deg b) 24 deg×22 deg, URL=www.sears.com TCODE=ADVIEW
These two records above in the DIGITAL COOKIE show that the same UU ID (also same DEV ID) has presented itself at two different websites at two distinct times with four distinct associated geo-locations.
The first record was a purchase using the PAN. The second visit was simply an ad view.

For the second record, no card was presented but the UU ID (and DEV ID) and associated PAN are recorded along with the associated physical locations.

Step B: Physical Spendmap
1. A user utilizes their PAN to make a purchase at physical store location.
2. The location (lat, long) of the store are recorded along with the time, amount and type of goods purchased.
Two sample records are as follows:
Record 3: PAN=66234 TIME=14:62, Dec 12 2012, GEO ID=a) 13 deg×15 deg SKU CODE: 344567
Record 4: PAN=66234, TIME=16:34, Dec 13 2012, GEO ID=a) 14 deg×18 deg SKU CODE: 1243567
These two records in the SPENDMAP show that the user has made two transactions with the same card on two separate days at two separate locations.

Step C: Match Algorithm
1. Each of the PHYSICAL SPENDMAP and DIGITAL COOKIE LISTS are joined (or grouped) by PAN
Record 1: UU ID=123456, PAN=66234, DEV ID=3435678, TIME=13:62, Dec 12 2012, GEO ID=a) 13 deg×15 deg b) 14 deg×23 deg, URL=www.vsk.com TCODE=BUY
Record 2: UU ID=123456, PAN=66234, DEV ID=3435678, TIME=15:34, Dec 13 2012, GEO ID=a) 14 deg×18 deg b) 24 deg×22 deg, URL=www.sears.com TCODE=ADVIEW
Record 3: PAN=66234 TIME=14:62, Dec 12 2012, GEO ID=a) 13 deg×15 deg SKU CODE: 344567
Record 4: PAN=66234, TIME=16:34, Dec 13 2012, GEO ID=a) 14 deg×18 deg SKU CODE: 1243567
2. The transactions are re-ordered in time sequence
Record 1: UU ID=123456, PAN=66234, DEV ID=3435678, TIME=13:62, Dec 12 2012, GEO ID=a) 13 deg×15 deg b) 14 deg×23 deg, URL=www.vsk.com TCODE=BUY
Record 3: PAN=66234 TIME=14:62, Dec 12 2012, GEO ID=a) 13 deg×15 deg SKU CODE: 344567
Record 2: UU ID=123456, PAN=66234, DEV ID=3435678, TIME=15:34, Dec 13 2012, GEO ID=a) 14 deg×18 deg b) 24 deg×22 deg, URL=www.sears.com TCODE=ADVIEW
Record 4: PAN=66234, TIME=16:34, Dec 13 2012, GEO ID=a) 14 deg×18 deg SKU CODE: 1243567
3. If the GEO ID of the PHYSICAL SPEND MAP records matches the GEO ID of the DIGITAL COOKIE AND the GEO ID for the DIGITAL COOKIE occurred in time sequence PRIOR TO THE SPEND MAP purchase transaction, THEN a match is made between the website ad and the subsequent purchase transaction.
The last two transactions (Record 2 and Record 4) match. An ad was displayed to the user from URL www.sears.com and a transaction occurred at a matching Sears location one hour later.

As discussed above, the URL viewed by the user's device may also be a webpage (e.g., a webpage of an appliance store website, instead of an actual digital ad for the appliance store). If so, the TCODE would be recorded as "WEBSITE." If the user purchased an item at a physical location of the appliance store a short time after viewing the website, a similar match would be identified.

The present invention may be implemented with any combination of hardware and software. If implemented as a computer-implemented apparatus, the present invention is implemented using means for performing all of the steps and functions described above.

When implemented in software, the software code for the servers can be executed on any suitable processor or collection of processors, whether provided in a single computer or distributed among multiple computers.

The present invention can also be included in an article of manufacture (e.g., one or more non-transitory, tangible computer program products) having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s) used herein for the servers may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method of tracking the effectiveness of viewing resources on electronic devices in causing transaction activity to subsequently occur at a physical location associated with the resources, the method comprising:
   (a) conducting web-browsing sessions with a plurality of electronic devices, each electronic device having a unique device identifier (UDID), wherein a plurality of resources are viewed during selected web-browsing sessions and a plurality of web-based transactions occur during selected web-browsing sessions, and wherein the electronic devices interact with a plurality of web servers and resource servers during the web-browsing sessions;
   (b) electronically capturing in a first memory a first set of data records communicated electronically via an electronic network to the first memory from one or more of the electronic devices, web servers and resource servers, each data record in the first set of data records including:
      (i) a uniform resource locator (URL) of a resource that was viewed by the electronic device during a web browsing session,
      (ii) one or more physical locations, each physical location representing a physical location of the merchant associated with the URL,
      (iii) a date/time that the resource was viewed by the electronic device, and
      (iv) payment instrument indicia regarding a payment instrument which has been used for completion of a previous web-based transaction by an electronic device having the same UDID that viewed the URL of the resource in step (b)(ii);
   (c) electronically capturing in a second memory a second set of data records communicated electronically via an electronic network to the second memory from one or more payment networks, each data record in the second set of data records including:
  (i) payment instrument indicia regarding a payment instrument which has been used for completion of a previous transaction at a physical location of a merchant,
  (ii) a physical location of the merchant, and
  (iii) a date/time that the previous transaction at the physical location of the merchant occurred;
(d) electronically comparing in a processor in real time the first set of data records in the first memory with the second set of data records in the second memory;
(e) based on the comparison in step (d), electronically identifying in real time using the processor any data records wherein a data record in the first set and a data record in the second set meet each of the following criterion:
  (i) the payment instrument indicia in the data record of the first set matches the payment instrument indicia in the data record of the second set,
  (ii) one of the physical locations in the data record of the first set matches the physical location in the data record of the second set, and
  (iii) the date/time in the data record of the first set is a predetermined amount of time prior to the date/time in the data record of the second set;
(f) outputting report information in real time regarding any data records that meet each of the criterion, wherein the report information is usable for tracking the effectiveness of viewing resources on electronic devices in causing transaction activity to subsequently occur at physical locations associated with the resources; and
(g) electronically communicating via an electronic network to respective merchants in real time when any data records are identified that meet each of the criterion,
wherein steps (b)-(g) are performed without human activity.

2. The method of claim 1 wherein the payment instrument indicia includes a primary account number (PAN) of the payment instrument or a token of a PAN of the payment instrument.

3. The method of claim 1 wherein the physical location of a merchant is represented in the data record by a latitude and longitude.

4. The method of claim 1 wherein the resource is a website.

5. The method of claim 1 wherein the resource is one of a web-based advertisement, a web-based offer, a mobile offer and a mobile advertisement.

6. The method of claim 1 wherein the previous web-based transaction is a transaction with an on-line merchant.

7. The method of claim 1 wherein the physical locations are deemed to match if the locations are within a defined radius of each other, wherein the radius is defined by a set of business rules.

8. The method of claim 1 wherein each data record in the second set of data records and any corresponding report information further includes at least one of purchase item indicia and total purchase amount, wherein the report information is further usable to gauge the value of the transaction activity.

9. An apparatus for tracking the effectiveness of viewing resources on electronic devices in causing transaction activity to subsequently occur at a physical location associated with the resources, the apparatus comprising:

(a) a plurality of electronic devices that conduct web-browsing sessions, each electronic device having a unique device identifier (UDID), wherein a plurality of resources are viewed during selected web-browsing sessions and a plurality of web-based transactions occur during selected web-browsing sessions, and wherein the electronic devices interact with a plurality of web servers and resource servers during the web-browsing sessions;
(b) a first memory that electronically captures a first set of data records communicated electronically via an electronic network to the first memory from one or more of the electronic devices, web servers and resource servers, each data record in the first set of data records including:
  (i) a uniform resource locator (URL) of a resource that was viewed by the electronic device during a web browsing session,
  (ii) one or more physical locations, each physical location representing a physical location of the merchant associated with the URL,
  (iii) a date/time that the resource was viewed by the electronic device, and
  (iv) payment instrument indicia regarding a payment instrument which has been used for completion of a previous web-based transaction by an electronic device having the same UDID that viewed the URL of the resource in clause (b)(ii);
(c) a second memory that electronically captures a second set of data records communicated electronically via an electronic network to the second memory from one or more payment networks, each data record in the second set of data records including:
  (i) payment instrument indicia regarding a payment instrument which has been used for completion of a previous transaction at a physical location of a merchant,
  (ii) a physical location of the merchant, and
  (iii) a date/time that the previous transaction at the physical location of the merchant occurred;
(d) a processor that electronically compares in real time the first set of data records with the second set of data records and electronically identifies in real time based on the comparison any data records wherein a data record in the first set and a data record in the second set meet each of the following criterion:
  (i) the payment instrument indicia in the data record of the first set matches the payment instrument indicia in the data record of the second set,
  (ii) one of the physical locations in the data record of the first set matches the physical location in the data record of the second set, and
  (iii) the date/time in the data record of the first set is a predetermined amount of time prior to the date/time in the data record of the second set; and
(e) a report module that receives report information regarding data records that are identified as meeting each of the criterion, wherein the report information is usable for tracking the effectiveness of viewing resources on electronic devices in causing transaction activity to subsequently occur at physical locations associated with the resources,
wherein the report module electronically communicates via an electronic network to respective merchants in real time when any data records are identified that meet each of the criterion.

10. The apparatus of claim 9 wherein the payment instrument indicia includes a primary account number (PAN) of the payment instrument or a token of a PAN of the payment instrument.

11. The apparatus of claim 9 wherein the physical location of a merchant is represented in the data record by a latitude and longitude.

12. The apparatus of claim 9 wherein the resource is a website.

13. The apparatus of claim 9 wherein the resource is one of a web-based advertisement, a web-based offer, a mobile offer and a mobile advertisement.

14. The apparatus of claim 9 wherein the previous web-based transaction is a transaction with an on-line merchant.

15. The apparatus of claim 9 wherein the physical locations are deemed to match if the locations are within a defined radius of each other, wherein the radius is defined by a set of business rules.

16. The apparatus of claim 9 wherein each data record in the second set of data records and any corresponding report information further includes at least one of purchase item indicia and total purchase amount, wherein the report information is further usable to gauge the value of the transaction activity.

\* \* \* \* \*